(12) United States Patent
Li et al.

(10) Patent No.: US 12,307,771 B2
(45) Date of Patent: May 20, 2025

(54) IMAGE PROCESSING METHOD AND APPARATUS IMPLEMENTING THE SAME

(71) Applicant: OMNIVISION TECHNOLOGIES, INC., Santa Clara, CA (US)

(72) Inventors: Shimiao Li, Singapore (SG); Ruijiang Luo, Singapore (SG); Zhongyang Huang, Singapore (SG); Guansong Liu, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 575 days.

(21) Appl. No.: 17/675,183

(22) Filed: Feb. 18, 2022

(65) Prior Publication Data
US 2023/0267739 A1   Aug. 24, 2023

(51) Int. Cl.
| | | |
|---|---|---|
| *G06K 9/46* | (2006.01) |
| *G06K 9/66* | (2006.01) |
| *G06V 10/40* | (2022.01) |
| *G06V 10/62* | (2022.01) |
| *G06V 10/766* | (2022.01) |
| *G06V 10/772* | (2022.01) |
| *G06V 20/40* | (2022.01) |
| *G06V 20/56* | (2022.01) |

(52) U.S. Cl.
CPC .............. *G06V 20/46* (2022.01); *G06V 10/40* (2022.01); *G06V 10/62* (2022.01); *G06V 10/766* (2022.01); *G06V 10/772* (2022.01); *G06V 20/56* (2022.01)

(58) Field of Classification Search
None
See application file for complete search history.

(56) References Cited

U.S. PATENT DOCUMENTS

| 8,358,840 B2 * | 1/2013 | Bronstein | H04N 21/4334 |
| | | | 382/284 |
| 9,532,069 B2 * | 12/2016 | Pace | H04N 19/54 |

(Continued)

OTHER PUBLICATIONS

Chen et al., "Lane mark detection with pre-aligned spatial-temporal attention." Sensors 22, No. 3 (2022): 794. (Year: 2022).*

(Continued)

*Primary Examiner* — Feng Niu
(74) *Attorney, Agent, or Firm* — Muncy, Geissler, Olds & Lowe, P.C.

(57) ABSTRACT

An image processing method and a device configured to implement the same are disclosed. The method comprises: from an imaging device, obtaining image data that comprises temporally consecutive image frames; performing feature extraction on each of the obtained image frames; dynamically retaining extracted feature data of the obtained image frames in a feature accumulation database by regulating data retention in the feature accumulation database to a selective subset of the extracted feature data from the obtained image frames; performing Random Sample Consensus (RANSAC) operation on the selective subset of the extracted feature data from the feature accumulation database; and generating an estimation model from output of the RANSAC operation based on at least one of an extracted feature data of a current image frame or extracted feature data of one or more temporally preceding image frames of the obtained image frames.

20 Claims, 10 Drawing Sheets

(56) References Cited

U.S. PATENT DOCUMENTS

| | | | | |
|---|---|---|---|---|
| 10,410,367 | B2* | 9/2019 | Ezra | G06T 7/70 |
| 2016/0140729 | A1* | 5/2016 | Soatto | G06T 7/277 |
| | | | | 348/135 |
| 2018/0061072 | A1* | 3/2018 | Benezra | G06T 7/246 |
| 2018/0194286 | A1* | 7/2018 | Stein | B60G 17/0165 |
| 2018/0365858 | A1* | 12/2018 | Kim | G06T 7/13 |
| 2020/0320314 | A1* | 10/2020 | Kim | H04N 13/204 |
| 2021/0041886 | A1* | 2/2021 | Liu | G05D 1/0088 |
| 2021/0192227 | A1* | 6/2021 | Lu | G06T 7/70 |
| 2022/0215572 | A1* | 7/2022 | Niigaki | G06T 7/0002 |
| 2023/0095621 | A1* | 3/2023 | Gorur | G06T 7/246 |
| | | | | 382/103 |
| 2023/0162468 | A1* | 5/2023 | Aoki | G06V 10/50 |
| | | | | 382/103 |
| 2023/0186647 | A1* | 6/2023 | Mahata | G01S 17/86 |
| | | | | 382/103 |

OTHER PUBLICATIONS

Lin et al., "Selective aggregated descriptors for robust mobile image retrieval," 2015 Asia-Pacific Signal and Information Processing Association Annual Summit and Conference (APSIPA), Hong Kong, China, 2015, pp. 169-177, doi: 10.1109/APSIPA.2015.7415497. (Year: 2015).*

Wang et al., "Implementing and Parallelizing Real-time Lane Detection on Heterogeneous Platforms," 2018 IEEE 29th International Conference on Application-specific Systems, Architectures and Processors (ASAP), Milan, Italy, 2018, pp. 1-8, doi: 10.1109/ASAP.2018.8445110. (Year: 2018).*

Nistér, David. "Preemptive RANSAC for live structure and motion estimation." Machine Vision and Applications 16, No. 5 (2005): 321-329. (Year: 2006).*

Ponsa et al., "On-board image-based vehicle detection and tracking." Transactions of the Institute of Measurement and Control 33, No. 7 (2011): 783-805. (Year: 2011).*

Luo, "Real time multi-sensor data acquisition and processing for a road mapping system." PhD diss., 2014. (Year: 2014).*

Wu et al., "Robust global motion estimation for video stabilization based on improved k-means clustering and superpixel." Sensors 21, No. 7 (2021): 2505. (Year: 2021).*

Mufti, Faisal & Mahony, Robert & Heinzmann, Jochen. (2008). "Spatio-Temporal RANSAC for Robust Estimation of Ground Plane in Video Range Images for Automotive Applications. IEEE Conference on Intelligent Transportation Systems," Proceedings, ITSC. 1142-1148. 10.1109/ITSC.2008.4732645.

Li, H., Wan, G., Li, H., Sharf, A., Xu, K. and Chen, B. (2016), "Mobility Fitting using 4D RANSAC," Computer Graphics Forum, 35: 79-88, https://doi.org/10.1111/cgf.12965.

Nicolas Pugeault, Norbert Krüger, "Temporal accumulation of oriented visual features, Journal of Visual Communication and Image Representation," vol. 22, Issue 2, 2011, pp. 153-163, ISSN 1047-3203, https://doi.org/10.1016/j.jvcir.2010.12.001.

N. Pellicano, E. Aldea and S. Le Hegarat-Mascle, "Robust wide baseline pose estimation from video," *2016 23rd International Conference on Pattern Recognition (ICPR)*, 2016, pp. 3820-3825, doi: 10.1109/ICPR.2016.7900230.

W. F. Sze, W. K. Tang, and Y. S. Hung "Dynamic RANSAC", Proc. SPIE 6066, Vision Geometry XIV, 60660H (Jan. 18, 2006); https://doi.org/10.1117/12.642764, 11 pages.

Benutzer: Haldir, RANSAC algorithm illustration: retrieved Feb. 18, 2022 from https://commons.wikimedia.org/wiki/File:RANSAC_LINIE_Animiert.gif, 1 page.

* cited by examiner (B)

(A)

IMAGE PROCESSING METHOD AND APPARATUS IMPLEMENTING THE SAME

BACKGROUND

1. Technical Field

The present disclosure generally relates to image processing method and device implementing the same, and pertains more specifically to an image processing implementation that performs selective estimation processing on a set of obtained image data, thereby conserving computational resources while enhancing estimation robustness.

2. Description of the Related Art

RANdom SAmple Consensus (RANSAC) is currently applied in computer vision and automotive related applications. RANSAC is an iterative method applicable to estimate the parameters of a mathematical model from a set of observed data that contains outliers. In computer vision, such observed data is usually a set of features extracted from images. In automotive related applications, RANSAC can be used to estimate lane vanishing point, driving direction vanishing point, camera rotation angles, ground plane, stereo camera calibration parameters etc. In such applications, robustness of RANSAC estimation is largely affected by the content of the road scene. In some scenes, we could only extract few features from a single spontaneously captured frame, whose feature content might not be enough for robust RANSAC estimation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
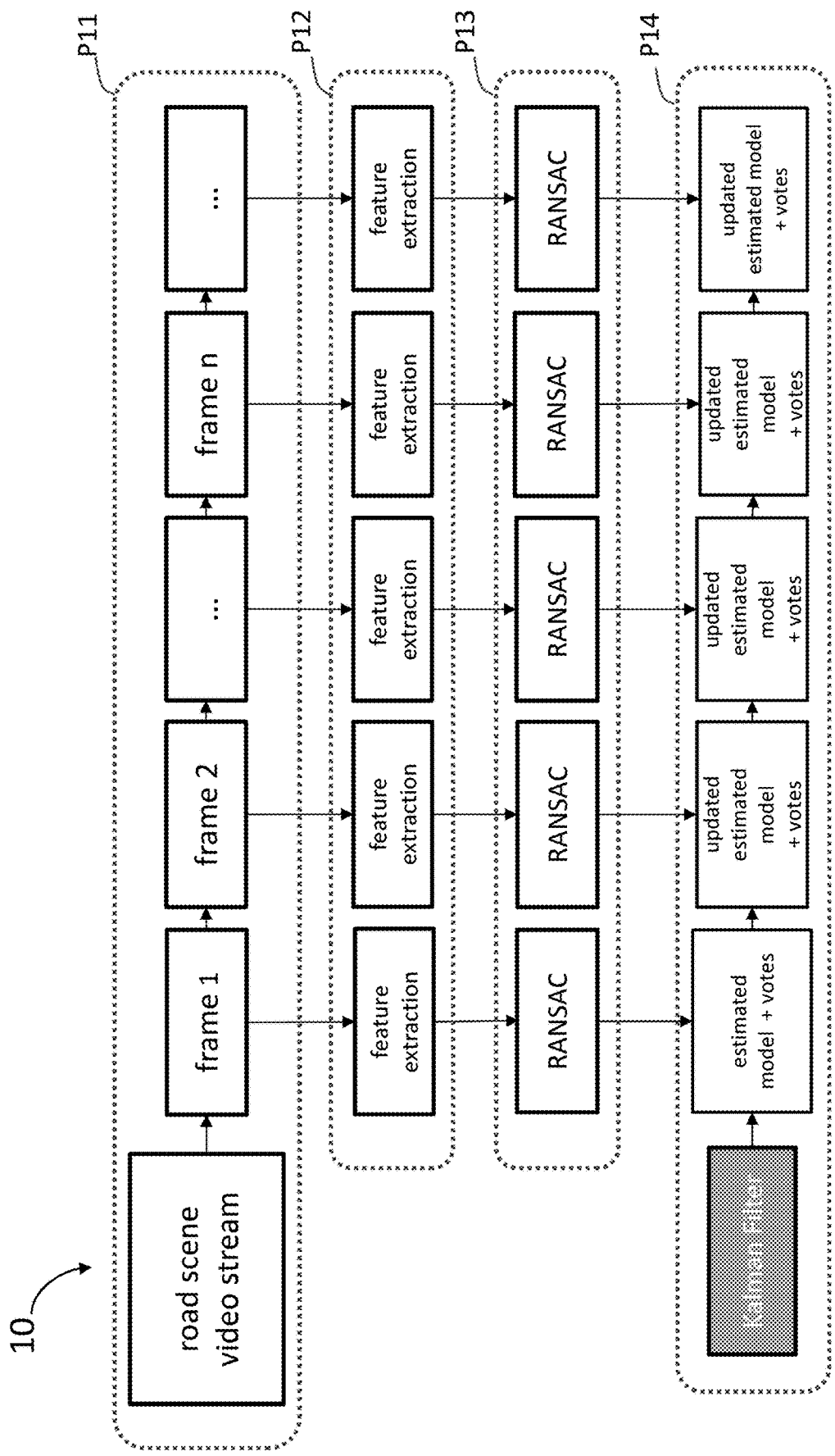
FIG. 1 is a schematic illustration of an exemplary image processing framework in accordance with some embodiments of video stream data estimation.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the quest for further autonomy in automobile applications, a variety of advanced driver assistance systems (ADAS) have been developed with the aim for vehicle automation and enhanced driver safety and driving experience. Most driver assistance systems function based on the information gathered around a vehicle's position, orientation and motion state to assist the driver in various ways. For example, during recent years, camera (image sensor) based driver assistance systems (DAS) have been popularized in the market.

Images obtained by the in-vehicle mounted sensor system may be used to provide driving support and visual field support. For example, based on the images captured by an in-vehicle camera, the location and direction of the vehicle may be detected and used for guidance information. Likewise, oncoming vehicles, preceding vehicles, pedestrians, obstacles, and others can be detected for accident avoidance. In addition, during low-observable driving conditions, the images captured by the in-vehicle camera can be processed to sense the headlights of the oncoming vehicle (or following vehicle) and the taillights of the preceding vehicle, thereby enabling the generation of useful information on the other surrounding vehicles that aids driver awareness. The functionalities of such driver assistance systems may include lane departure warning (LDW), automatic high-beam control (AHC), traffic sign recognition (TSR) forward collision warning (FCW), and pedestrian detection.

In some applications (e.g., visual odometry), image processing techniques may be utilized to determine a vehicle's position. In typical applications, image sensors of various types and configurations are used to capture image inputs. Image corrections may then be applied, and predefined features may then be recognized/extracted from the captured image data. The extracted features may then be matched across the sequence of captured image frames, and an optical flow field may be constructed, e.g., by using correlation. The correspondence between temporally sequential images may then be established, e.g., by feature extraction and correlation, or by constructing an optical flow field using the Lucas-Kanade method. Tracking errors may be detected, and the corresponding outliers may be compensated/discarded while the camera motion may be estimated from the optical flow (e.g., by using a Kalman filter or by minimizing a cost function that is based on geometric properties of the features). In some applications, camera calibration for the orientation parameters of an image sensor system (such as the tilting angle and pan angle thereof) may be performed using detected parallel lines and corresponding vanishing points. In some applications, the detection of vanishing points may be achieved by using a projection onto a normalized unit sphere.

Among the other algorithms adaptable for ADAS applications, RANdom SAmple Consensus (RANSAC) is an iterative algorithm designed to estimate the parameters of a mathematical model from a set of observed data that contains outliers. In computer vision applications, such observed data may comprise a set of features (such as feature points, line segments) extracted from the captured image frame (e.g., a single, or a sequence of image frames). In automotive related applications, RANSAC processing may be used to estimate lane vanishing point, driving direction vanishing point, camera rotation angles, ground plane, stereo camera calibration parameters etc.

Figure 7:
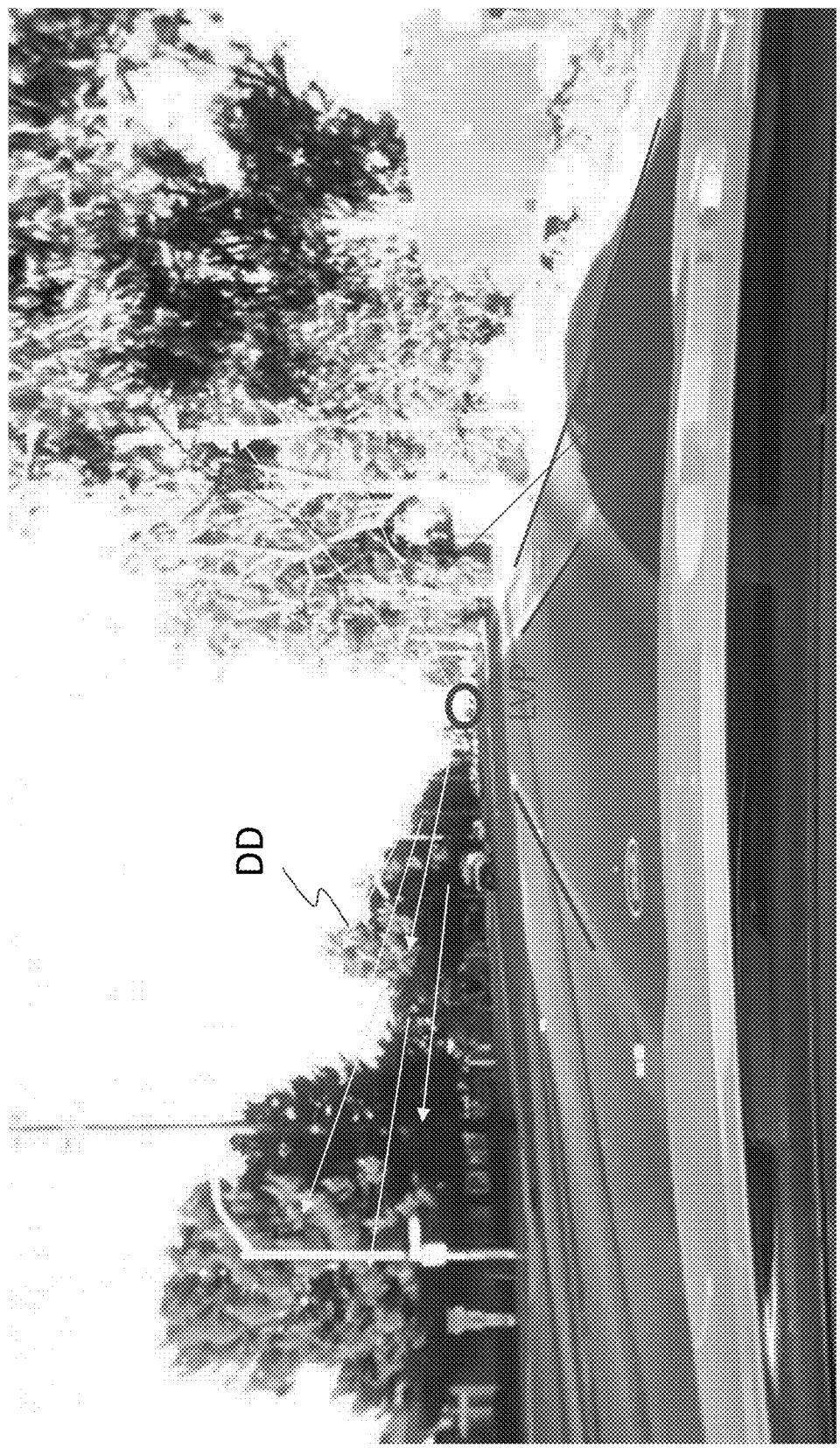
FIG. 7 shows a photo image of exemplary road scene data captured by an image processing system in accordance with some embodiments of the instant disclosure.

For example, referring ahead to FIG. 7, which shows a photo image of exemplary road scene data from an image processing system in accordance with some embodiments of the instant disclosure. In the illustration photo image, a dashboard mounted image sensor system captures an image frame that shows the host vehicle moving along the traffic in a suburban residential neighborhood.

In the exemplary road scene image, RANSAC estimation for driving direction vanishing point from optical flow are visualized as arrows DD in the central region of the image. For instance, the arrows DD indicative of the optical flow substantially follow the backward relative motion of the tree top foliage. In addition, RANSAC estimation for lane vanishing point (LVP) from the extracted lane line segment data (e.g., by estimating the line segment interception) at the lower central location of the image.

By dynamically applying RANSAC processing to the extracted feature data from the spontaneously captured image frame sequences, valuable navigation information may be obtained, which may be further utilized to enable valuable driver assistance functionalities.

FIG. 1 is a schematic illustration of an exemplary image processing framework in accordance with some embodiments of video stream data estimation. For instance, FIG. 1 schematically illustrates an image processing framework 10 that utilizes random sample consensus (RANSAC) algorithm and Kalman filter for road scene video stream data estimation according to some embodiments of automotive application.

The exemplary image processing framework of FIG. 1 employs RANSAC processing on features extracted from each individual frame from a road scene video stream. For instance, the exemplary electronic image processing framework starts from an image acquisition module P11, which operates to obtain image data that comprises temporally consecutive image frames from an imaging device. In some embodiments, the image acquisition operation may be implemented by utilizing a vehicle mounted image sensing devices, e.g., a forward looking camera.

A feature extraction module P12 is then provided for performing feature extraction operation on each of the obtained image frames in the sequence of the obtained data. In some embodiments, the feature extraction module P12 is implemented by a processing device, which may incorporate necessary hardware circuitry, software, or firmware components configured to perform feature extraction operation on each of the captured sequence of temporally consecutive image frames.

An estimation module P13 is then incorporated for applying RANSAC algorithm on the extracted features from each of the obtained image frames. In some embodiments, the estimation module P13 is implemented by a processing device, which may incorporate necessary hardware circuitry, software, or firmware components configured to perform RANSAC estimation operation on the extracted feature data that corresponds to each of the captured image frames.

The exemplary framework 10 subsequently incorporates a model generation module P14, where estimation models corresponding to each of the obtained image frames may be generated. In some embodiments, the model generation module P14 is implemented by a processing device, which may incorporate necessary hardware circuitry, software, or firmware components configured to generate estimation models based on output from the RANSAC estimation operation.

In the context of the instant disclosure, a "feature" may refer to 2D image points, 3D image points (e.g., obtained by time of flight/TOF camera or some scanner), or line segments, etc., observed/recognized in an obtained image frame. The term "feature extraction" may refer to a process of line detection, optical flow estimation, or 3D scanning of scene, etc., performed on an obtained image frame data. For instance, in some embodiments, the parallel lines of one vanishing point may correspond to lateral boundaries of a street. In some embodiments, the parallel lines may correspond to demarcations on the street. The term "weight" may refer to a value of significance assigned to each of the extracted features, which may represent the length of a line segment, or optical flow matching measurement. In some embodiments, the weight is used for RANSAC voting. In addition, the term "estimated model" may refer to a predefined model estimation for vanishing point of a lane, some extrinsic/intrinsic camera parameters, or 3D plane equation of the ground etc.

In the illustrated embodiment of FIG. 1, the exemplary image processing framework 10 conducts RANSAC estimation processing on feature data extracted from each one of the captured image frames. In some scenarios, this single frame-by-frame estimation scheme posts may be less than ideal. For one thing, it has been experimentally shown that the actual number of required iterations for obtaining a solution during a RANSAC estimation operation is often more than the estimated iterations by up to an order of magnitude. Thus, for dynamic high frame rate applications, the required computing resources for such a single frame processing scheme would be significant. For another, the robustness of RANSAC estimation on each obtained frame largely depends on content of the scene. In situations where a scene from a single captured frame only contains few extractable features, the limited number of useful features might not be sufficient to afford adequate robustness in a single frame RANSAC estimation scheme. Accordingly, the reliability of the generated estimation model may be affected due to the lack of useful scene content.

Figure 2:
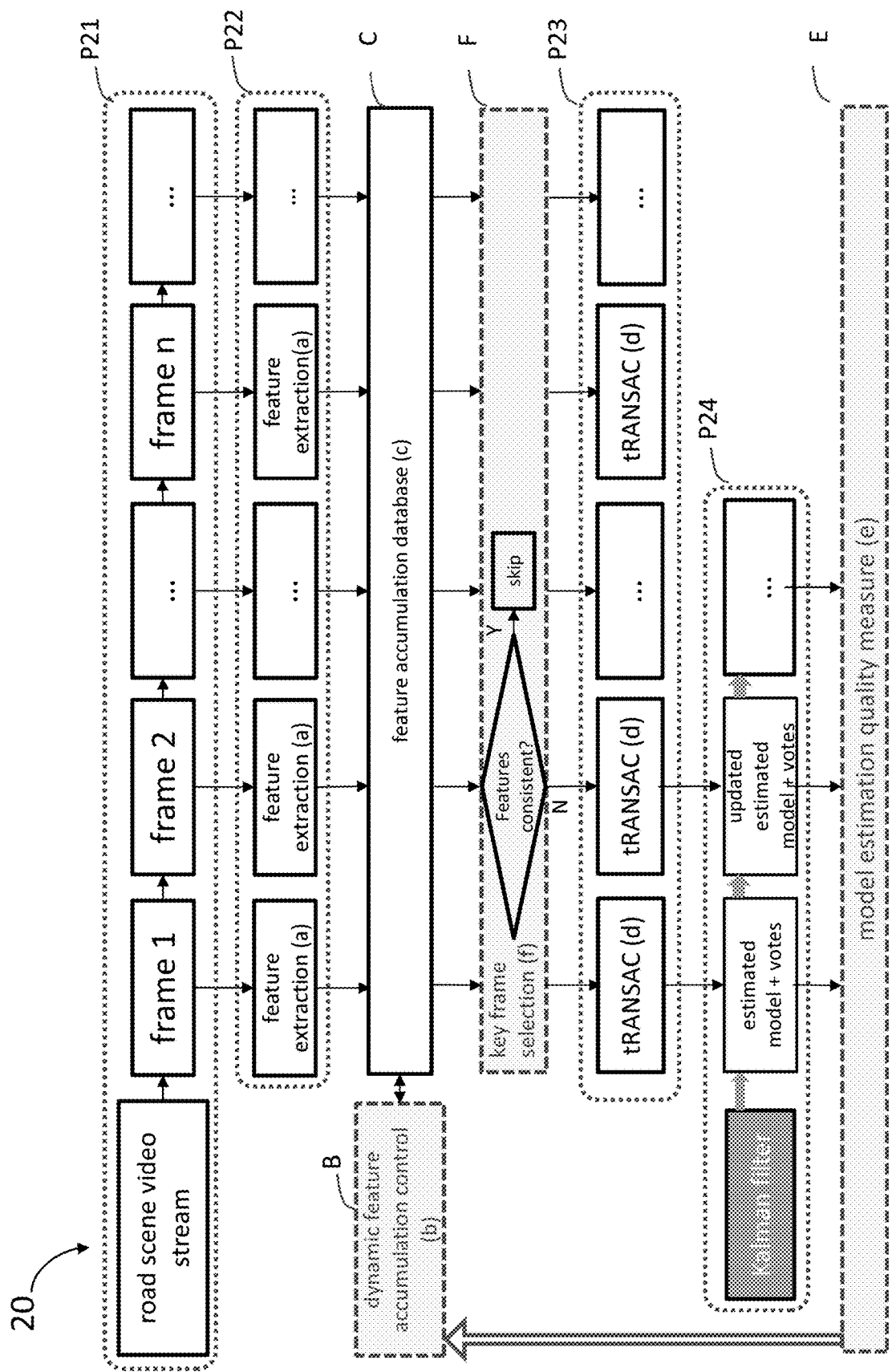
FIG. 2 is another schematic illustration of an exemplary image processing framework for video stream data estimation in accordance with some embodiments of the instant disclosure.

FIG. 2 is another schematic illustration of an exemplary image processing framework for video stream data estimation in accordance with some embodiments of the instant disclosure. For instance, FIG. 2 schematically illustrates an image processing framework 20 that utilizes random sample consensus (RANSAC) algorithm with additional process modules designed to enhance processing efficiency and increase estimation model robustness.

The illustrated embodiment introduces a framework referred to as Dynamic Feature Accumulation across Time for RANSAC Model Estimation (tRANSAC), which is designed to dynamically accumulate features across time so that RANSAC can be robustly performed with large number of features that are accumulated in a longer time period. To accomplish the newly proposed framework, a functional modules are integrated into the RANSAC framework.

The exemplary electronic image processing framework 20 starts from an image acquisition module P21, which operates to obtain image data that comprises temporally consecutive image frames from an imaging device. A feature extraction module P22, which may be implemented by a processing device that comprises a feature extraction component (a), which may include necessary hardware circuitry, software, or firmware components configured to perform feature extraction operation on each of the obtained image frames in the sequence of the obtained data. An estimation module P23 is then provided to perform RANSAC processing on a selected subset of the extracted feature data from the obtained image frames. The framework subsequently proceeds to model generation module P24, where estimation models corresponding to a subset of the obtained image frames are generated.

Rather than directly performing RANSAC processing on the extracted features from each individual frame, embodiments of the instant disclosure seeks to dynamically gather the extracted features from the captured frames in a dynamic feature accumulation pool before being selectively forwarded for RANSAC processing. In the instant embodiment, a dynamic accumulated feature pool (module C) is inserted between the feature extraction module P22 and the estimation module P23, which operates to dynamically retain feature data of the obtained image frames. In some embodiments, the dynamic accumulated feature pool C is implemented by a feature accumulation database (c), which may comprise a data storage component configured to selectively retain the extracted feature data from the obtained image frames. For instance, in some embodiments, the feature pool module C may be regulated to retain a selective subset of the extracted feature data from the sequence of obtained image frames.

In the illustrated embodiment, a key frame selection module F is downstream arranged between the dynamic accumulation feature pool C and the RANSAC estimation module P23. In some embodiments, the key frame selection module F is implemented by a processing device, which may comprise a key frame selection component (f) that incorporate necessary hardware circuitry, software, or firmware components, and operates to compare and determine whether the newly extracted features from a currently obtained image frame is consistent with an existing RANSAC estimation model generated based on previously acquired feature data. In some embodiments, the key frame selection module F is configured to selectively forward new feature data from a current image frame to the RANSAC estimation module P23. In some embodiments, the key frame selection module F is configured to forward new feature data for further RANSAC processing when the newly acquired frame contains feature data that are no longer consistent with a previously calculated RANSAC model. In some scenarios, a newly obtained current feature data no longer fits a previously generated RANSAC model when there is a dramatic scene change from a prior image frame to a subsequent frame. For instance, when an onboard camera system captures a dramatic scene change when the host vehicle gets off a ramp and exists an otherwise uneventful highway cruise.

For example, the sequence of image data captured during the highway cruise may be dull and predictable, especially when the travelling on a straight stretch of road with largely unchanged open scenery. Accordingly, the corresponding estimation model generated from such uneventful sequence of image data would remain largely consistent. Therefore, from a resource management standpoint, there would be less meaningful to spend valuable computing and storage recourses on such consistent (repetitive/redundant) feature data. Conversely, when the host vehicle enters a ramp and gets off the highway, the dramatic change in scenery indicates that the vehicle is about to enter a new and uncharted environment. Accordingly, the corresponding estimation model generated from image data with substantial scenery change (e.g., noticeable changes in extracted features) may no longer agree with the prior estimation model, which was generated based on previous image sequences whose extracted features substantially depart from that of the current frame.

The implication of such consistency between a current feature data and a previously generated estimation model would be meaningful, as it likely indicates a need for a model update. In some embodiments, RANSAC processing for feature data associated with less eventful frames may be skipped, thereby conserving computational resources. In some embodiments, only when a newly acquired frame contains feature data that are no longer consistent with a previously calculated RANSAC model (e.g., eventful frame) will the feature of the new frame be forwarded for RANSAC processing. In some embodiments, the key frame selection module F operates to identify such inconsistent frame in a temporally consecutive image data, and designates it as a key frame.

The integration of the feature pool module C and the key frame selection module F provides the estimation module P23 a selective buffer, and enables it to perform RANSAC operation on a subset of the extracted feature data from the feature accumulation database (c). Moreover, with the refined processing scheme of the exemplary framework 20, the model generation module P24 may generate an estimation model from the output of the estimation module P23 based on feature data of more than a single image frame, thereby facilitating higher robustness of model generation. In some embodiments, an estimation model may be generated based on at least one of an extracted feature data of a current image frame (e.g., a key frame) or the extracted feature data of one or more temporally preceding image frames (e.g., one or more selectively accumulated frames that precede the key frame).

In the illustrated embodiment, a model estimation quality measurement module E is further introduced downstream of the model generation module P24. In some embodiments, the model estimation quality measurement module E is implemented by a processing device, which may comprise a model quality measuring component (e) that incorporates necessary hardware circuitry, software, or firmware components, and operates to measure the quality (e.g., consistency) of a currently adopted estimation model. In some embodiments, the model estimation quality measurement module E determines a quality of an estimation model by evaluating a quality variable (q), which may be a function of parameters such as RANSAC support votes, total number of features used for RANSAC processing, and current model residual error, etc. In some embodiments, the result of the model quality measurement module E serves as a determining parameter for the dynamic data retention strategy/scheduling of the dynamic accumulated feature pool C.

The exemplary framework 20 further incorporates a dynamic feature accumulation control module B inserted between the dynamic accumulated feature pool C and the model estimation quality measurement module E. The dynamic feature accumulation control module B may be provided to regulate data accumulation in the feature accumulation database (c) based on output from the model estimation quality measurement module E. In some embodiments, the dynamic feature accumulation control module B is implemented by a processing device, which may comprise a dynamic feature accumulation controller (b) that incorporates necessary hardware circuitry, software, or firmware components, and operates to control data access and retention scheduling in the feature accumulation database (c). In some embodiments, the control module B may operate to dynamically control the retention of extracted feature data from each of the obtained image frames, thereby regulating data retention in the feature accumulation database (c) to a selective subset of the extracted feature data from the consecutive sequence of the obtained image frames.

Accordingly, based on the control of the control module B, the extracted feature data from newly obtained frames are initially added to the feature accumulation database (c). The subsequently obtained, updated feature data in the pool are used to check current consistency with prior generated RANSAC model. In some embodiments, only when the consistency is found below a certain threshold, a corresponding new frame would be considered a key frame, and the currently accumulated content in the feature accumulation database (c) is forwarded to the estimation module P23 for RANSAC estimation. Therefore, when the RANSAC estimation tends to perform robustly (e.g., when a newly extracted feature data from a currently obtained image frame is consistent with a previously generated RANSAC estimation model), the accumulated features data in the feature accumulation database (c) may be are discarded at a higher rate so that fewer redundant features are retained and used for RANSAC estimation. Conversely, when the RANSAC estimation is found to be performed poorly, accumulated features in the feature accumulation database (c) are regulated to be discarded at a slower rate, so that more features can be accumulated and used for enhancing the robustness of RANSAC estimation.

Figure 8:
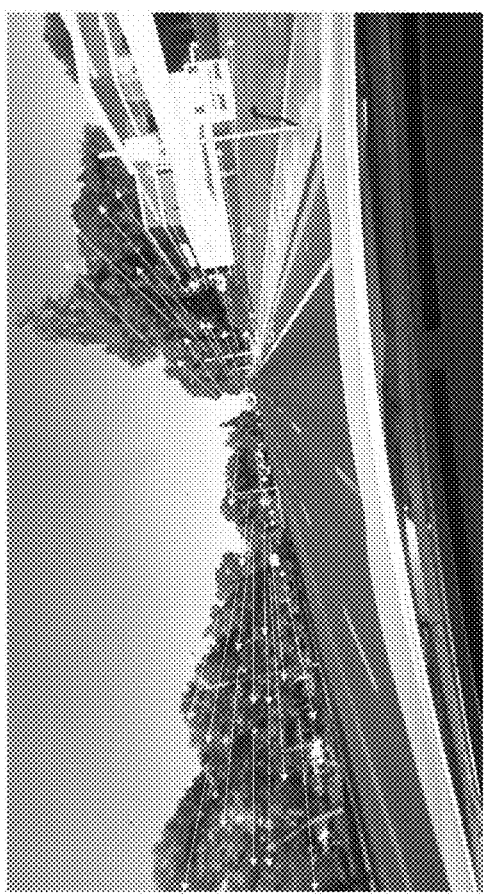
FIG. 8 shows photo images of exemplary road scene data processing in accordance with some embodiments of the instant disclosure.
Figure 8:
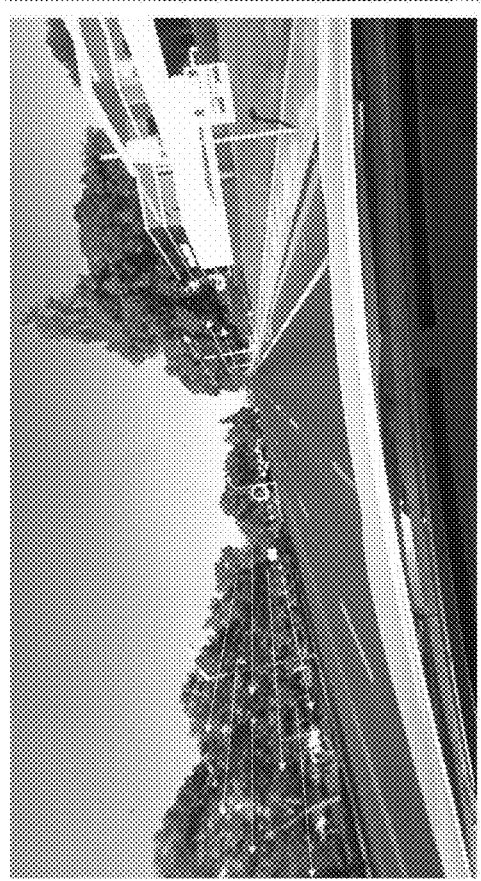

Referring ahead to FIG. 8, which shows photo images of exemplary road scene data processing in accordance with some embodiments of the instant disclosure. For instance, the images in FIG. 8 illustrate results of driving direction vanish point estimation using optical flow.

Particularly, photo image (A) of FIG. 8 illustrates a result of RANSAC estimation using extracted feature data from a single captured image frame. It can be observed that, with less useable features extracted from a single captured frame, the resultant accuracy of the RANSAC estimation would be less robust. For instance, the estimated driving direction vanish point D1 in photo image (A) inaccurately lands on the left side across the opposing lane of the road. In contrast, photo image (B) of FIG. 8 illustrates a result of RANSAC estimation using extracted feature data from an accumulated set of image frames. It is observed that, with more useable features accumulated from a set of more than one captured frames, the resultant accuracy of the RANSAC estimation may be improved. In this case, the estimated driving direction vanish point D2 in photo image (B) more accurately reflects the driving direction along the road.

Figure 9:
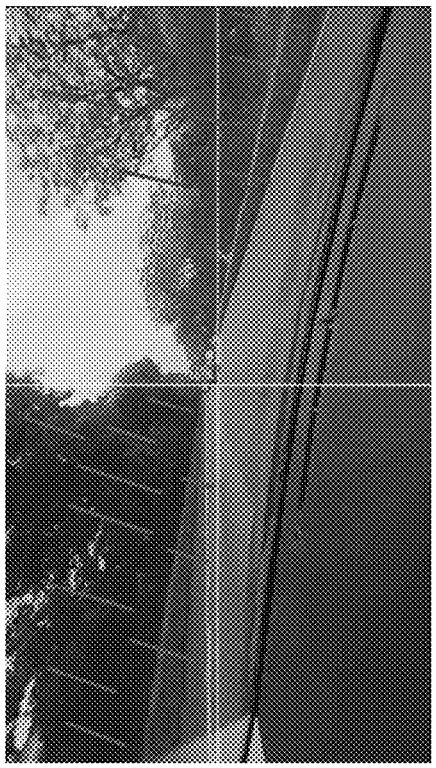
FIG. 9 shows photo images of exemplary road scene data processing in accordance with some embodiments of the instant disclosure.
Figure 9:
Figure 9:
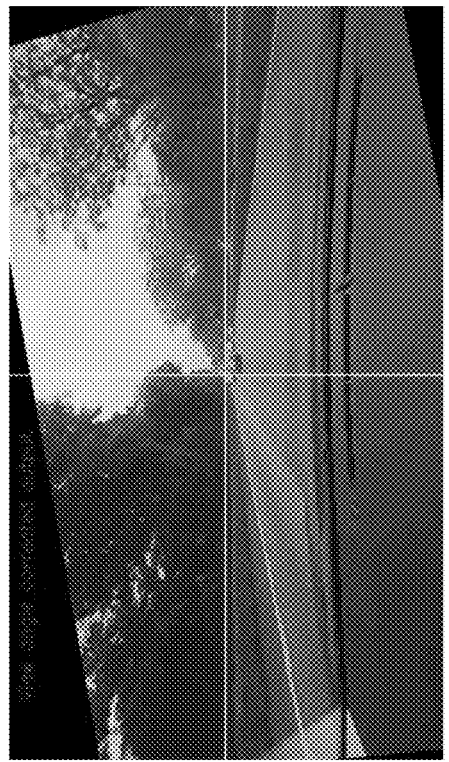
Figure 9:
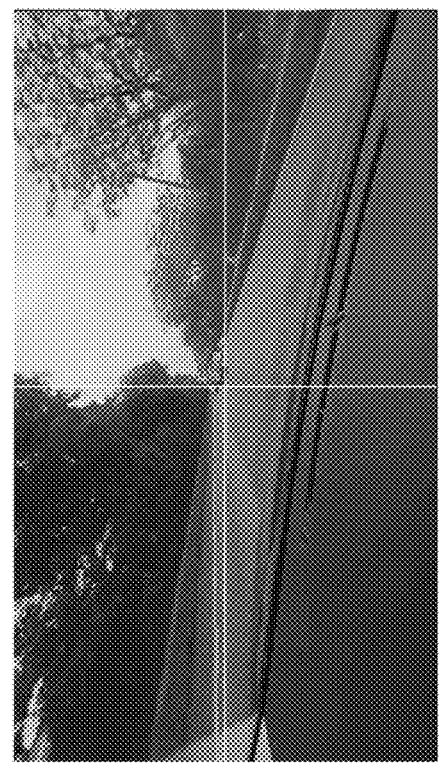
Figure 9:
Figure 9:
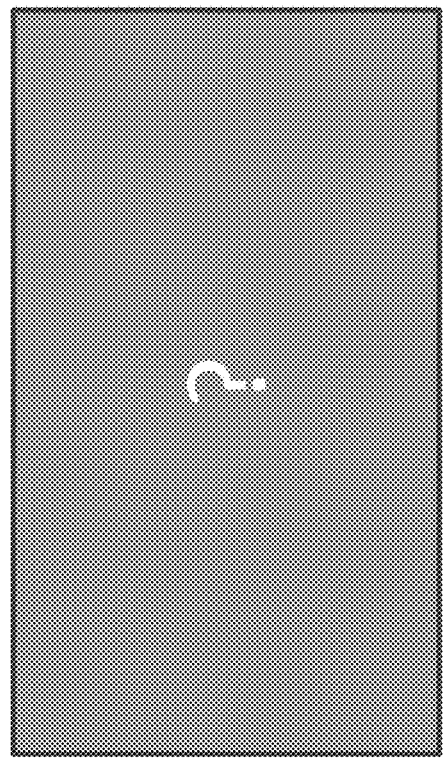

Referring further ahead to FIG. 9, which shows photo images of exemplary road scene data processing in accordance with some embodiments of the instant disclosure. For instance, the images in FIG. 9 illustrate results of camera roll angle estimation using line segment features.

Particularly, photo image (A) of FIG. 9 illustrates a result of RANSAC estimation using extracted line segment features from a single captured image frame. Due to the lack of sufficient feature volume from a single image frame, no correct roll angle estimation can be obtained. In contrast, photo image (B) of FIG. 9 illustrates a result of RANSAC estimation using extracted line segment features from an accumulated series of image frames. It is observed that, with more useable features accumulated from a series of captured frames, a proper roll angle estimation may be achieved, thereby enabling the generation of a corrected image (as shown in the bottom right photo).

Figure 3:
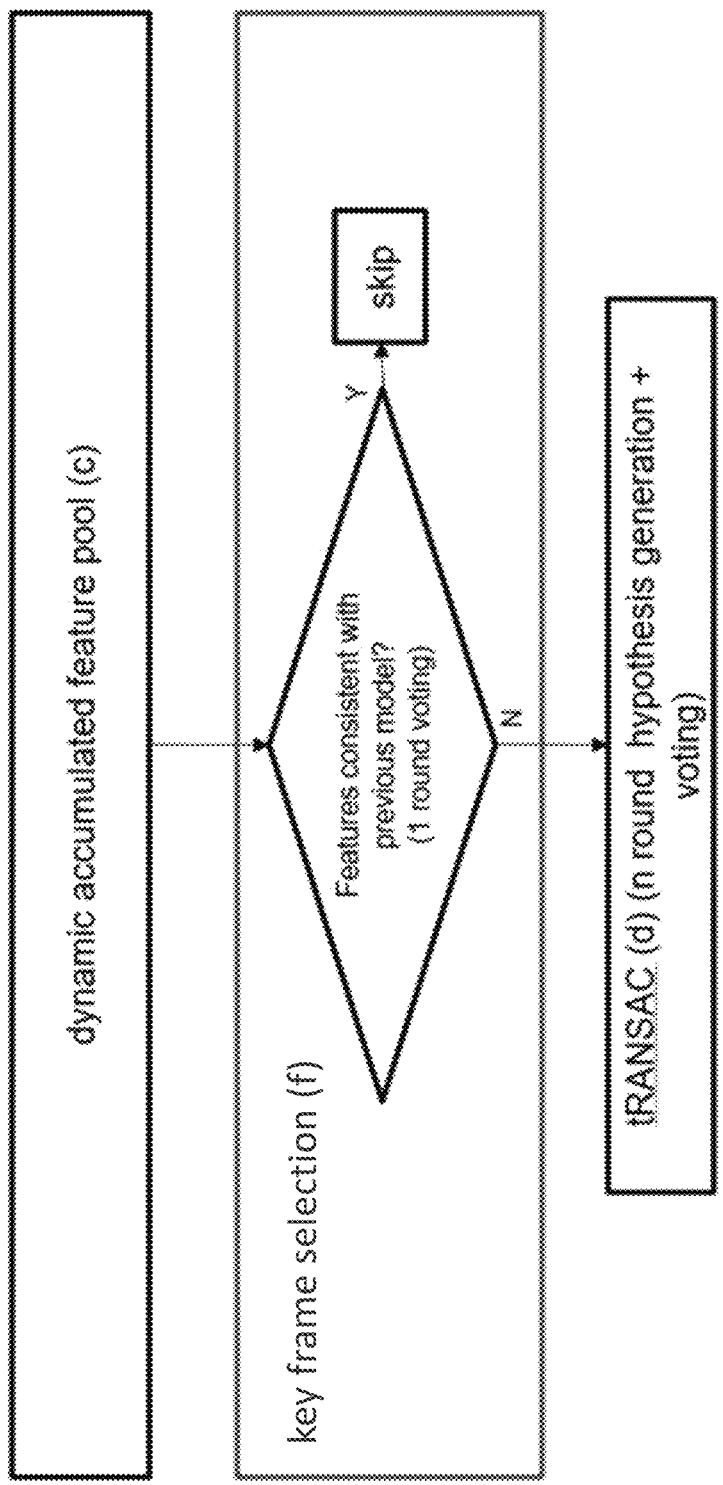
FIG. 3 shows an exemplary dynamic feature accumulation process for an image processing method in accordance with some embodiments of the instant disclosure.

Referring back to FIG. 3, which shows an exemplary key frame selection process for an image processing method in accordance with some embodiments of the instant disclosure. For instance, FIG. 3 shows a schematic flow of a key frame selection operation from a dynamic accumulated feature pool (c), through a key frame selection component (f), to a tRANSAC processing component (d).

In some embodiments, the performing of RANSAC operation on a selective subset of the extracted feature data may comprise: among the obtained image frames, determining, e.g., by the key frame selection component (f), whether a newly obtained image frame constitutes a key frame; and subsequently, forwarding the extracted feature data of the key frame from the feature pool (c) to the tRANSAC processing component (d) for selective RANSAC processing.

Depending on the robustness of the tRANSAC estimation results, in some embodiments, an accumulated feature data preceding that of the key frame may be further forwarded from the feature pool (c) to the tRANSAC processing component (d) for selective RANSAC estimation. In some embodiments, the key frame determination process comprises: performing consistency check on the extracted feature data from the current image frame with respect to a temporally preceding estimation model. In some embodiments, when a consistency rating of the extracted feature data of the current image frame is below a consistency threshold, designating the current image frame as a key frame. In some embodiments, when a currently capture image frame is designated a key frame, the extracted feature data of the key frame is retained in the feature pool (c) for a longer temporal duration. In contrast, when a newly captured image frame is not designated a key frame, the extracted feature data thereof may be retained in the feature pool (c) for a shorter period of time.

Figure 4:
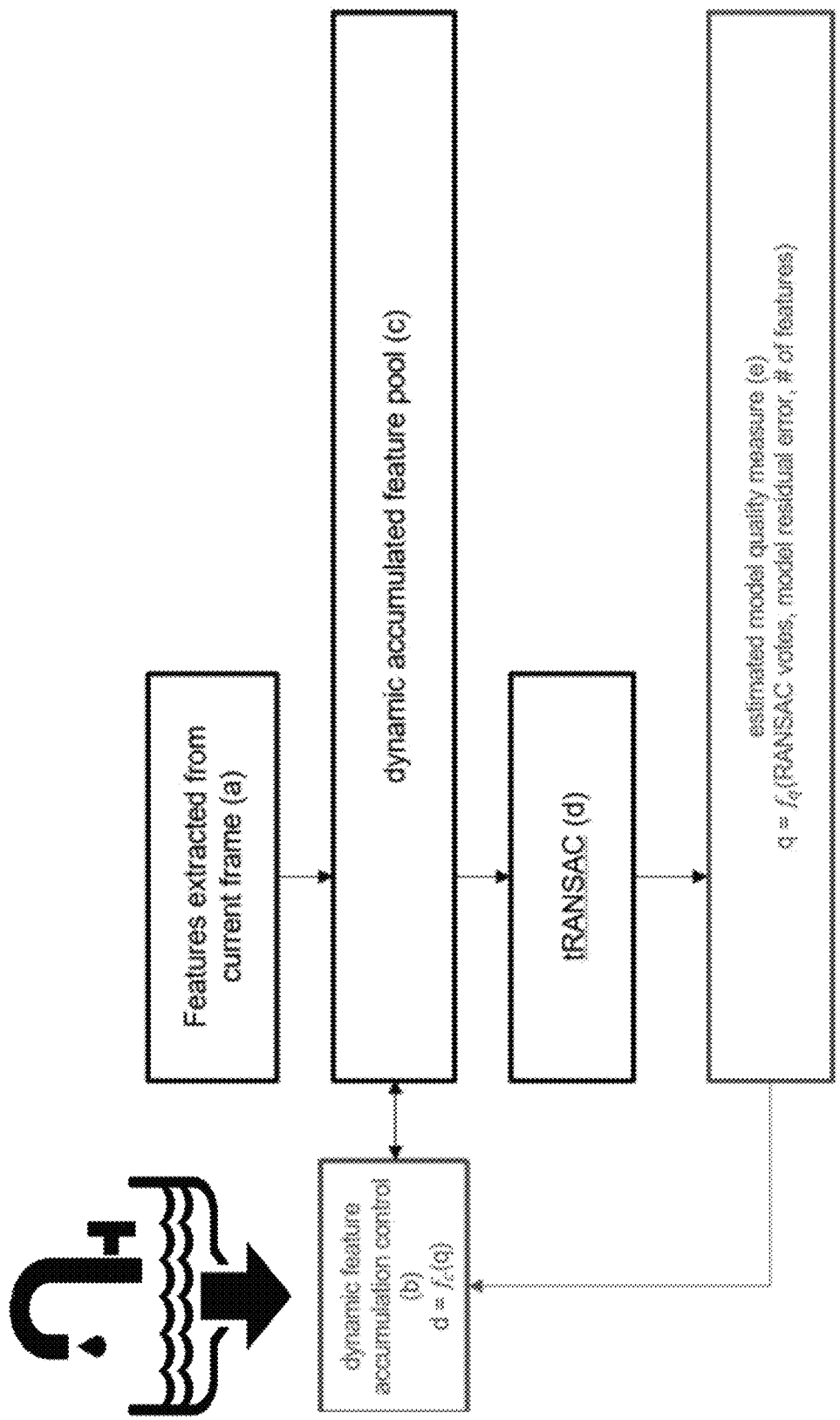
FIG. 4 shows an exemplary implementation of a dynamic feature accumulation process in accordance with some embodiments of the instant disclosure.
Figure 5:
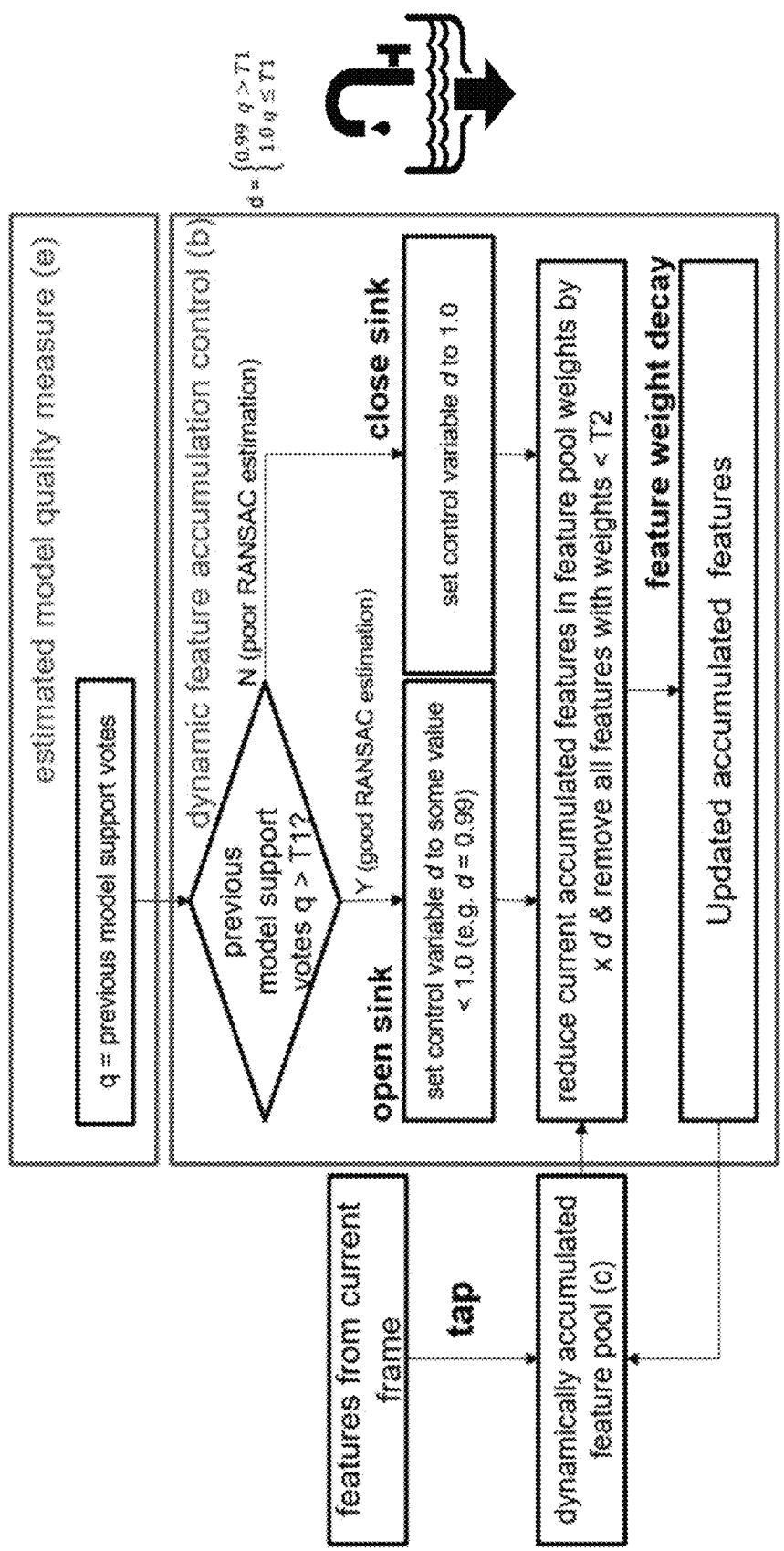
FIG. 5 shows an exemplary key frame selection process for an image processing method in accordance with some embodiments of the instant disclosure.

Please refer concurrently to FIG. 4 and FIG. 5. FIG. 4 shows an exemplary implementation of a dynamic feature accumulation process in accordance with some embodiments of the instant disclosure. FIG. 5 shows an exemplary dynamic feature accumulation process for an image processing method in accordance with some embodiments of the instant disclosure.

For instance, FIG. 4 shows an exemplary image processing flow of captured image frame data from a feature extraction component (a) of a feature extraction module to a feature accumulation database (c) of a feature pool module, in which feature data are selectively retained for further RANSAC processing. The selectively accumulated feature data is then forwarded to a processing component (d) of an estimation module for tRANSAC computation, whose output is utilized to generate an updated estimation model. The generated estimation model is then fed to a model quality measuring component (e) of a model estimation quality measurement module for consistency evaluation. The outcome of the model quality evaluation is then fed to a dynamic feature accumulation controller (b) of a dynamic feature accumulation control module to sever as a basis for determining the dynamic data retention strategy/scheduling of the feature accumulation database (c).

In some embodiments, the model quality measuring component (e) of a model estimation quality measurement module is configured to measure current model estimation quality. The determination of current model quality may be based on a quality measure variable q, which may be a function quality variable q is a function of RANSAC support votes, total number of features used for RANSAC and current model residual error, etc.

By way of example, the dynamic feature accumulation control module (b) may operate to regulate access into/out of the feature accumulation database (c) like a water tap and a sink. For instance, the control module (b) may be configured to allow new features from new frame data to flow into the feature pool and let old feature data to be phased out from the feature pool. In some embodiments, the control of the tap and the sink relies on a dynamic accumulation control variable d, which may be a function of the model estimation quality variable q.

In some embodiments, the dynamic feature accumulation control module (b) may be configured to take the quality measure variable q from the model quality measuring component (e) as input, and adjust the dynamic accumulation control variable d. In some embodiments, the dynamic accumulation control variable d is set to be $$d = f_c(q),$$

where $f_c$ is a monotonically decreasing function.

In some embodiments, function is arranged so that the better the model estimation quality (e.g., a higher q value), the smaller the control variable d. In some embodiments, it is so arranged that, with smaller d, less feature data tends to be accumulated over time for reducing RANSAC computational cost. Conversely, with larger d, more feature data tends to be accumulated over time for improving RANSAC model estimation robustness.

In some exemplary image processing method of the instant disclosure, for each of the generated estimation model, a model quality measure variable q is generated for the evaluation of an estimation model quality. In some embodiments, the model quality measure variable q comprises a function of RANSAC support votes, total number of feature used for RANSAC, and current model residual error, etc. In some embodiments, the dynamical retention of extracted feature data in a feature accumulation database (c) may be performed by regulating a discard rate of the retained extracted feature data in the feature accumulation database based at least in part on the model quality measure variable q. In some embodiments, regulating the discard rate of the feature accumulation database may comprises generating a control variable d having a value not greater than 1 by inputting the model quality measure variable q into a dynamic accumulation control function (e.g., d=fc(q)), where the dynamic accumulation control function comprises a monotonically decreasing function.

In some embodiments, an exemplary image process method of the instant disclosure may be further arranged so that when the dynamic accumulation control function satisfies a predetermined first quality threshold (e.g., T1), setting the control variable d to a value less than 1. Accordingly, in some embodiments, the lesser value of the control variable d affects a reduction of the retention volume of extracted feature data in the feature accumulation database (c). In some embodiments, reducing the retention volume in the feature accumulation database (c) may be performed by reducing a current data accumulation weight factor by a factor of d, and removing the retained feature data in the feature accumulation database (c) with a weight factor less than a predetermined second quality threshold value (e.g., T2). In some embodiments, the dynamic accumulation control function is designated to affect an inversely proportional relationship between the estimation model quality q and the control variable d.

In one exemplary embodiment, the dynamic accumulation control variable d is set to be:

$$d = \frac{1}{\sigma\sqrt{2\pi}},$$

where σ is proportional to the model quality measure variable q.

With such an arrangement, the dynamic accumulation control variable d, which is a continuous monotonically decreasing function of q, serves as a feature weight time decay factor. For example, the larger the value of q, the smaller d would be, and whereby the faster the older feature data would be discarded. In is noted that, while the finite length of the instant disclosure permits the affirmative introduction of only few workable examples, in some embodiments, other arrangements for the abovementioned functions and variables may also apply.

Figure 6:
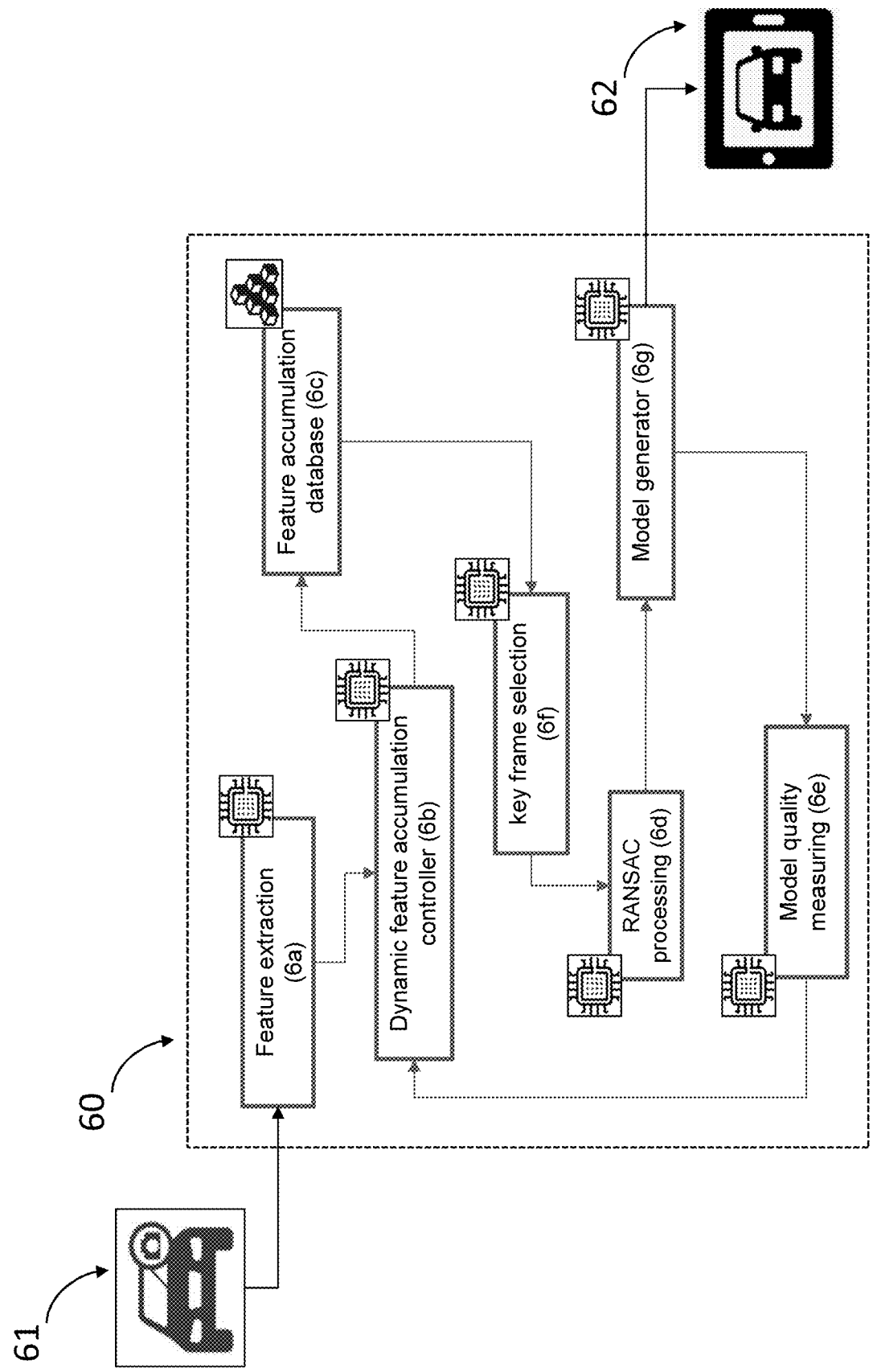
FIG. 6 shows an exemplary image processing system configured to perform an image processing method in accordance with some embodiments of the instant disclosure.

FIG. 6 shows an exemplary image processing system configured to perform an image processing method in accordance with some embodiments of the instant disclosure. For instance, an exemplary image processing system is shown to be configured to receive a stream of image data from a dashboard mounted imaging system (e.g., system 61), and output a computation result to an onboard image display (e.g., system 62).

In the illustrated embodiment, the exemplary image processing system comprises a processing device 60 configured to obtain image data that comprises temporally consecutive image frames from an imaging device. The processing device 60 may comprise: a feature extraction component (6a) configured to receive image data from the imaging device and to extract feature data from each of the obtained image frames; a feature accumulation database (6c) in data communication with the feature extraction component (6a), configured to selectively retain the extracted feature data; a Random Sample Consensus (RANSAC) processing component (6d) configured to apply RANSAC process on the extracted features from the feature accumulation database (6c); a model generator (6g) arranged downstream of the RANSAC processing component, configured to generate estimated model from an output of the RANSAC processing circuit; and a key frame selection component (6f) arranged data communicatively between the feature accumulation database (6c) and the RANSAC processing component (6d), configured to perform consistency check on the extracted feature data from a newly obtained image frame with respect to a temporally preceding estimation model from the model generator.

In some embodiments, the key frame selection component (6f) is further configured to: designate the newly obtained image frame as a key frame when a consistency rating of the extracted feature data of the newly obtained image frame is below a predetermined consistency threshold, and forwarding an accumulated extracted feature data that includes the extracted feature data of the key frame from the feature accumulation database (6c) to the RANSAC processing component (6d) for selective RANSAC processing.

In some embodiments, the exemplary system 60 further comprises a model quality measuring component (6e) arranged data communicatively downstream of the model generator (6g), configured to evaluate estimation model quality for each of the generated estimation model and to generate a model quality measure variable q such as that depicted in the prior discussion.

In some embodiments, the exemplary system 60 further comprises a dynamic feature accumulation controller (6b) configured to dynamically regulate data accumulation in the feature accumulation database in accordance with the model quality measure variable q.

Each of the system components in the instant embodiment may be implemented by a processing device that incorporates necessary hardware circuitry, software, or firmware components, and operates to perform the respective functions as discussed. It is further noted that each of the various system components of the processing device 60 may be formed by common or different circuitry within a processing unit, and configured to execute program instructions read from a memory coupled thereto. For instance, the memory may be used by one or more of the shown circuits of the processing device 60 for interim storage during calculations, and for storing computed data. The memory may also store program instructions read and executed by the processing device 60 to carry out its operations.

Depending on applications, the processing device 60 may be implemented as a multi-functional computing hardware or an application specific hardware. For example, applicable types of processing devices may include central processing unit (CPU), digital signal processor (DSP), image signal processor (ISP), etc. In some embodiments, a processor may include a multi-core processor that contains multiple processing cores in a computing device. In some embodiments, various elements associated with the processing device 60 may be shared by other devices.

Figure 10:
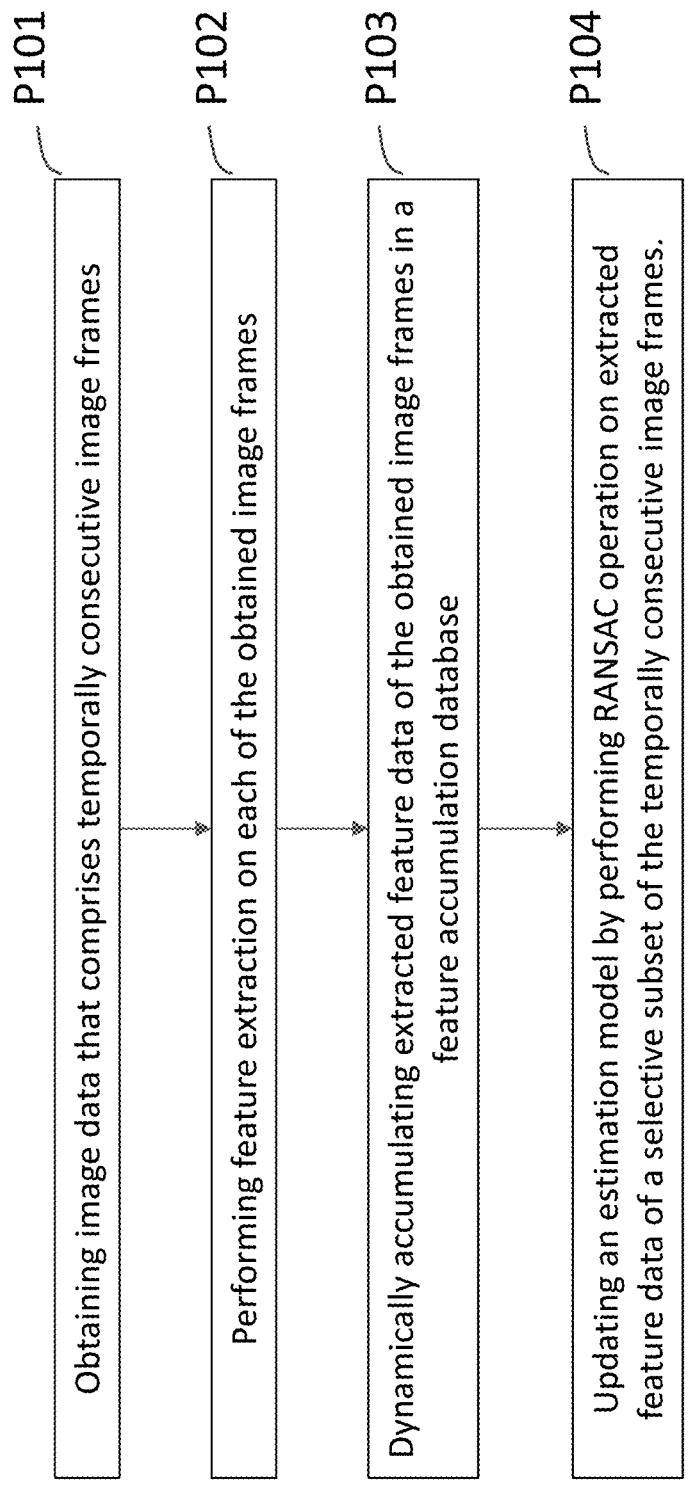
FIG. 10 shows a flow chart of an exemplary image processing method in accordance with some embodiments of the instant disclosure.

FIG. 10 shows a flow chart of an exemplary image processing method in accordance with some embodiments of the instant disclosure.

The exemplary image processing method comprises:

Operation P101: from an imaging device, obtaining image data that comprises temporally consecutive image frames;

Operation P102: performing feature extraction on each of the obtained image frames;

Operation P103: dynamically accumulating extracted feature data of the obtained image frames in a feature accumulation database; and Operation P104: updating an estimation model by performing RANSAC operation on extracted feature data of a selective subset of the temporally consecutive image frames.

In some embodiments, performing RANSAC operation on the extracted feature data of a selective subset of Operation P104 comprises: among the obtained image frames, determining whether a newly obtained image constitutes a key frame, and forwarding the extracted feature data of the key frame from the feature accumulation database for selective RANSAC operation.

In some embodiments, the key frame determination process comprises: performing consistency check on the extracted feature data from a current image frame with respect to a temporally preceding estimation model. In some embodiments, when a consistency rating of the extracted feature data of the current image frame is below a consistency threshold, designating the current image frame as a key frame.

In some embodiment, when the current image frame is designated key frame, the extracted feature data of the key frame in the feature accumulation database is regulated to be retained for a first temporal duration. In some embodiments, when the current image frame is not designated key frame, the extracted feature data of the current image frame in the feature accumulation database is set to be retained for a second temporal duration that is shorter than the first temporal duration.

In some embodiments, for each of the generated estimation model, evaluating an estimation model quality by generating a model quality measure variable (e.g., quality variable q). In some embodiments, wherein the model quality measure variable q comprises a function of RANSAC support votes, total number of features used for RANSAC, and current model residual error.

In some embodiments, dynamically accumulating extracted feature data in a feature accumulation database in Operation P103 comprises: regulating a discard rate of the retained extracted feature data in the feature accumulation database based at least in part on the model quality measure variable (e.g., variable q).

In some embodiments, regulating a discard rate of the feature accumulation database comprises: generating a control variable (e.g., dynamic accumulation control variable d) having a value not greater than 1 by inputting the model quality measure variable (e.g., variable q) into a dynamic accumulation control function. In some embodiments, the dynamic accumulation control function comprises a monotonically decreasing function.

In some embodiments, when the dynamic accumulation control function does not satisfy a predetermined first quality threshold (e.g., first threshold T1), setting the control variable d to a value of 1; and expanding a retention volume of extracted feature data in the feature accumulation database by accumulating extracted feature data from the current image frame into the feature accumulation database. In some embodiments, the dynamic accumulation control function is designated to affect an inversely proportional relationship between the estimation model quality and the control variable d.

While a standard RANSAC method may be used to solve general computer vision problems, the instantly proposed tRANSAC framework may better solve problems in automotive applications. The tRANSAC framework may be suitable for ADAS (Autonomous Driving Assistant System) related applications with better robustness and less time/computational cost. For one thing, compared to a baseline RANSAC method, the instantly disclosed tRANSAC framework takes advantage of dynamic nature of road scene video stream by accumulating features across time in dynamic way. In such way, the vulnerable-ness of RANSAC estimation to road scene content may be overcome. For another, by adding a dynamic feature accumulating component, features are only accumulated when RANSAC model cannot be robustly estimated. This reduces unnecessary time cost compared to naively accumulating features across time. Moreover, by adding a key frame selection component, RANSAC may be performed only in selective frames where the accumulated feature data is no longer consistent with a previous estimated model. This arrangement may save noticeable computational time.

Accordingly, one aspect of the instant disclosure provides a computer implemented image processing method. The method comprises: performing feature extraction on each of the obtained image frames; dynamically retaining extracted feature data of the obtained image frames in a feature accumulation database by regulating data retention in the feature accumulation database to a selective subset of the extracted feature data from the obtained image frames; performing Random Sample Consensus (RANSAC) operation on the selective subset of the extracted feature data from the feature accumulation database; and generating an estimation model from output of the RANSAC operation based on at least one of an extracted feature data of a current image frame or extracted feature data of one or more temporally preceding image frames of the obtained image frames.

In some embodiments, the performing of RANSAC operation on the selective subset of the extracted feature data comprises: among the obtained image frames, determining whether a newly obtained image frame constitutes a key frame, and forwarding the extracted feature data of the key frame from the feature accumulation database for selective RANSAC operation.

In some embodiments, the method further comprises: further forwarding an accumulated extracted feature data preceding that of the key frame from the feature accumulation database for selective RANSAC operation.

In some embodiments, the key frame determination process comprises: performing consistency check on the extracted feature data from the current image frame with respect to a temporally preceding estimation model, and when a consistency rating of the extracted feature data of the current image frame is below a consistency threshold, designating the current image frame as a key frame.

In some embodiments, when the current image frame is designated key frame, the extracted feature data of the key frame in the feature accumulation database is regulated to be retained for a first temporal duration; when the current image frame is not designated key frame, the extracted feature data of the current image frame in the feature accumulation database is set to be retained for a second temporal duration that is shorter than the first temporal duration.

In some embodiments, the method further comprises: for each of the generated estimation model, evaluating an estimation model quality by generating a model quality measure variable, wherein the model quality measure variable comprises a function of RANSAC support votes, total number of features used for RANSAC, and current model residual error.

In some embodiments, dynamically retaining extracted feature data in a feature accumulation database comprises: regulating a discard rate of the retained extracted feature data in the feature accumulation database based at least in part on the model quality measure variable.

In some embodiments, regulating a discard rate of the feature accumulation database comprises: generating a control variable having a value not greater than 1 by inputting the model quality measure variable into a dynamic accumulation control function.

In some embodiments, the dynamic accumulation control function comprises a monotonically decreasing function.

In some embodiments, the method further comprises: when the dynamic accumulation control function satisfies a predetermined first quality threshold, setting the control variable to a value less than 1; and reducing a retention volume of extracted feature data in the feature accumulation database.

In some embodiments, reducing a retention volume of extracted feature data in the feature accumulation database may be performed by: reducing a current data accumulation weight factor by factor of the control variable, and removing the retained extracted feature data in the feature accumulation database with weight factor less than a predetermined second quality threshold.

In some embodiments, the dynamic accumulation control function is designated to affect an inversely proportional relationship between the estimation model quality and the control variable.

Accordingly, another aspect of the instant disclosure provides a computer implemented image processing method. The comprises: from an imaging device, obtaining image data that comprises temporally consecutive image frames; performing feature extraction on each of the obtained image frames; dynamically accumulating extracted feature data of the obtained image frames in a feature accumulation database; and updating an estimation model by performing RANSAC operation on extracted feature data of a selective subset of the temporally consecutive image frames.

In some embodiments, performing RANSAC operation on extracted feature data of a selective subset comprises: among the obtained image frames, determining whether a newly obtained image constitutes a key frame, and forwarding the extracted feature data of the key frame from the feature accumulation database for selective RANSAC operation.

In some embodiments, the key frame determination process comprises: performing consistency check on the extracted feature data from a current image frame with respect to a temporally preceding estimation model, and when a consistency rating of the extracted feature data of the current image frame is below a consistency threshold, designating the current image frame as a key frame.

In some embodiments, when the current image frame is designated key frame, the extracted feature data of the key frame in the feature accumulation database is retained for a first temporal duration; when the current image frame is not designated key frame, the extracted feature data of the current image frame in the feature accumulation database is retained for a second temporal duration that is shorter than the first temporal duration.

In some embodiments, the method further comprises: for each of the generated estimation model, evaluating an estimation model quality by generating a model quality measure variable, wherein the model quality measure variable comprises a function of RANSAC support votes, total number of features used for RANSAC, and current model residual error.

In some embodiments, dynamically accumulating extracted feature data in a feature accumulation database comprises: regulating a discard rate of the retained extracted feature data in the feature accumulation database based at least in part on the model quality measure variable.

In some embodiments, regulating a discard rate of the feature accumulation database comprises: generating a control variable having a value not greater than 1 by inputting the model quality measure variable into a dynamic accumulation control function, wherein the dynamic accumulation control function comprises a monotonically decreasing function.

In some embodiments, the method further comprises: when the dynamic accumulation control function does not satisfy a predetermined first quality threshold, setting the control variable to a value of 1; and expanding a retention volume of extracted feature data in the feature accumulation database by accumulating extracted feature data from the current image frame into the feature accumulation database.

In some embodiments, the dynamic accumulation control function is designated to affect an inversely proportional relationship between the estimation model quality and the control variable.

Accordingly, yet another aspect of the instant disclosure provides an image processing system. The system comprises: a processing device configured to obtain image data that comprises temporally consecutive image frames from an imaging device. The processing device comprises: a feature extraction component configured to receive image data from the imaging device and to extract feature data from each of the obtained image frames; a feature accumulation database in data communication with the feature extraction circuit, configured to selectively retain the extracted feature data; a Random Sample Consensus (RANSAC) processing component configured to apply RANSAC process on the extracted features from the feature accumulation database; a model generator arranged downstream of the RANSAC processing component, configured to generate estimated model from an output of the RANSAC processing circuit; and a key frame selection component arranged data communicatively between the feature accumulation database and the RANSAC processing component, configured to perform consistency check on the extracted feature data from a newly obtained image frame with respect to a temporally preceding estimation model from the model generator.

In some embodiments, the key frame selection component is further configured to: designate the newly obtained image frame as a key frame when a consistency rating of the extracted feature data of the newly obtained image frame is below a predetermined consistency threshold, and forwarding an accumulated extracted feature data that includes the extracted feature data of the key frame from the feature accumulation database to the RANSAC processing circuit for selective RANSAC processing.

In some embodiments, the system further comprises: a model quality measuring component arranged data communicatively downstream of the model generator, configured to evaluate estimation model quality for each of the generated estimation model and to generate a model quality measure variable.

In some embodiments, the system further comprises: a dynamic feature accumulation controller configured to dynamically regulate data accumulation in the feature accumulation database in accordance with the model quality measure variable.

Those skilled in the art will readily observe that numerous modifications and alterations of the device and method may be made while retaining the teachings of the instant disclosure. Accordingly, the above disclosure should be construed as limited only by the metes and bounds of the appended claims.

What is claimed is:

1. A computer implemented image processing method, comprising:
   from an imaging device, obtaining image data that comprises temporally consecutive image frames;
   performing feature extraction on each of the obtained image frames;
   dynamically retaining extracted feature data of the obtained image frames in a feature accumulation database by regulating data retention in the feature accumulation database to a selective subset of the extracted feature data from the obtained image frames;
   performing Random Sample Consensus (RANSAC) operation on the selective subset of the extracted feature data from the feature accumulation database; and
   generating an estimation model from output of the RANSAC operation based on at least one of an extracted feature data of a current image frame or extracted feature data of one or more temporally preceding image frames of the obtained image frames.

2. The method of claim 1, wherein performing RANSAC operation on the selective subset of the extracted feature data comprises:
   among the obtained image frames, determining whether a newly obtained image frame constitutes a key frame, and
   forwarding the extracted feature data of the key frame from the feature accumulation database for selective RANSAC operation.

3. The method of claim 2, further comprising:
   further forwarding an accumulated extracted feature data preceding that of the key frame from the feature accumulation database for selective RANSAC operation.

4. The method of claim 2, wherein the key frame determination process comprises:
   performing consistency check on the extracted feature data from the current image frame with respect to a temporally preceding estimation model, and
   when a consistency rating of the extracted feature data of the current image frame is below a consistency threshold, designating the current image frame as a key frame.

5. The method of claim 4, wherein when the current image frame is designated as the key frame, retaining the extracted feature data of the key frame in the feature accumulation database for a first temporal duration;
   wherein when the current image frame is not designated as the key frame, retaining the extracted feature data of the current image frame in the feature accumulation database for a second temporal duration that is shorter than the first temporal duration.

6. The method of claim 4, further comprising:
   for each of the generated estimation model, evaluating an estimation model quality by generating a model quality measure variable, wherein the model quality measure variable comprises a function of RANSAC support votes, total number of features used for RANSAC, and current model residual error.

7. The method of claim 6, wherein dynamically retaining extracted feature data of the obtained image frames in a feature accumulation database comprises:
regulating a discard rate of the retained extracted feature data of the obtained image frames in the feature accumulation database based at least in part on the model quality measure variable.

8. The method of claim 7, wherein regulating a discard rate of the feature accumulation database comprises:
generating a control variable having a value not greater than 1 by inputting the model quality measure variable into a dynamic accumulation control function,
wherein the dynamic accumulation control function comprises a monotonically decreasing function.

9. The method of claim 8, further comprising:
when the dynamic accumulation control function satisfies a predetermined first quality threshold, setting the control variable to a value less than 1; and
reducing a retention volume of extracted feature data in the feature accumulation database by:
reducing a current data accumulation weight factor by factor of the control variable, and
removing retained extracted feature data in the feature accumulation database with weight factor less than a predetermined second quality threshold.

10. The method of claim 9, wherein the dynamic accumulation control function is designated to affect an inversely proportional relationship between the estimation model quality and the control variable.

11. A computer implemented image processing method, comprising:
from an imaging device, obtaining image data that comprises temporally consecutive image frames;
performing feature extraction on each of the obtained image frames;
accumulating extracted feature data of the obtained image frames in a feature accumulation database; and
generating an estimation model by performing RANSAC operation on extracted feature data of a selective subset of the temporally consecutive image frames,
wherein performing RANSAC operation on extracted feature data of a selective subset comprises:
among the obtained image frames, determining whether a newly obtained image constitutes a key frame, and
forwarding the extracted feature data of the key frame from the feature accumulation database for selective RANSAC operation,
wherein the key frame determination process comprises:
performing consistency check on the extracted feature data from a current image frame with respect to a temporally preceding estimation model, and
when a consistency rating of the extracted feature data of the current image frame is below a consistency threshold, designating the current image frame as a key frame,
wherein when the current image frame is designated key frame, retaining the extracted feature data of the key frame in the feature accumulation database for a first temporal duration;
wherein when the current image frame is not designated key frame, retaining the extracted feature data of the current image frame in the feature accumulation database for a second temporal duration that is shorter than the first temporal duration.

12. A computer implemented image processing method, comprising:
from an imaging device, obtaining image data that comprises temporally consecutive image frames;
performing feature extraction on each of the obtained image frames;
accumulating extracted feature data of the obtained image frames in a feature accumulation database;
generating an estimation model by performing RANSAC operation on extracted feature data of a selective subset of the temporally consecutive image frames; and
for each of the generated estimation model, evaluating an estimation model quality by generating a model quality measure variable,
wherein the model quality measure variable comprises a function of RANSAC support votes, total number of features used for RANSAC, and current model residual error,
wherein performing RANSAC operation on extracted feature data of a selective subset comprises:
among the obtained image frames, determining whether a newly obtained image constitutes a key frame, and
forwarding the extracted feature data of the key frame from the feature accumulation database for selective RANSAC operation,
wherein the key frame determination process comprises:
performing consistency check on the extracted feature data from a current image frame with respect to a temporally preceding estimation model, and
when a consistency rating of the extracted feature data of the current image frame is below a consistency threshold, designating the current image frame as a key frame.

13. The method of claim 12, wherein accumulating extracted feature data of the obtained image frames in a feature accumulation database comprises:
regulating a discard rate of the accumulated extracted feature data in the feature accumulation database based at least in part on the model quality measure variable.

14. The method of claim 13, wherein regulating a discard rate of the feature accumulation database comprises:
generating a control variable having a value not greater than 1 by inputting the model quality measure variable into a dynamic accumulation control function,
wherein the dynamic accumulation control function comprises a monotonically decreasing function.

15. The method of claim 14, further comprising:
when the dynamic accumulation control function does not satisfy a predetermined first quality threshold, setting the control variable to a value of 1; and
expanding a retention volume of extracted feature data in the feature accumulation database by accumulating extracted feature data from the current image frame into the feature accumulation database.

16. The method of claim 15, wherein the dynamic accumulation control function is designated to affect an inversely proportional relationship between the estimation model quality and the control variable.

17. An image processing system, comprising:
a processing device configured to obtain image data that comprises temporally consecutive image frames from an imaging device, the processing device comprising:

a feature extraction component configured to receive image data from the imaging device and to extract feature data from each of the obtained image frames;

a feature accumulation database in data communication with the feature extraction component, configured to selectively retain the extracted feature data;

a Random Sample Consensus (RANSAC) processing component configured to apply RANSAC process on the extracted feature data from the feature accumulation database;

a model generator arranged downstream of the RANSAC processing component, configured to generate estimated model from an output of the RANSAC processing component; and a key frame selection component arranged communicatively between the feature accumulation database and the RANSAC processing component, configured to perform consistency check on the extracted feature data from a newly obtained image frame with respect to a temporally preceding estimation model from the model generator.

18. The system of claim 17, wherein the key frame selection component is further configured to:

designate the newly obtained image frame as a key frame when a consistency rating of the extracted feature data of the newly obtained image frame is below a predetermined consistency threshold, and forwarding an accumulated extracted feature data that includes the extracted feature data of the key frame from the feature accumulation database to the RANSAC processing component for selective RANSAC processing.

19. The system of claim 18, further comprising a model quality measuring component arranged communicatively downstream of the model generator, configured to evaluate estimation model quality for each of the generated estimation model, and to generate a model quality measure variable.

20. The system of claim 19, further comprising a dynamic feature accumulation controller configured to dynamically regulate data accumulation in the feature accumulation database in accordance with the model quality measure variable.

* * * * *